April 26, 1938. E. L. FICKETT ET AL 2,114,998

PRESSURE TREATING DEVICE

Original Filed March 17, 1933 5 Sheets-Sheet 3

April 26, 1938.   E. L. FICKETT ET AL   2,114,998

PRESSURE TREATING DEVICE

Original Filed March 17, 1933     5 Sheets—Sheet 5

Patented Apr. 26, 1938

2,114,998

UNITED STATES PATENT OFFICE

2,114,998

PRESSURE TREATING DEVICE

Ernest L. Fickett, William O. Forman and Philip E. Arthur, Fitchburg, Mass., assignors, by mesne assignments, to United Shoe Machinery Corporation, Boston, Mass., a corporation of New Jersey Application March 17, 1933, Serial No. 661,264
Renewed February 12, 1937

38 Claims. (Cl. 91—46)

This invention relates to impregnating apparatus of the type in which the articles to be impregnated are placed in a pressure-sustaining chamber provided with a pressure-tight closure, the chamber is filled with an impregnating liquid to immerse the articles, the pressure of the liquid is raised to speed impregnation, the pressure is thereafter released, and finally the closure is released and retracted, thereby removing the articles of work from the impregnating chamber. The invention is herein illustrated as embodied in an improved apparatus designed more especially for the purpose of tempering leather soles to condition them for the various manufacturing operations through which they will subsequently pass. It is to be understood however that neither the invention nor the illustrated apparatus is limited to the tempering of soles nor to the use of any particular impregnating liquid.

The illustrated apparatus is of the type in which all the operations included in a cycle are brought about automatically in a prescribed sequence when once the cycle is initiated.

Accordingly, with a view to improving the construction, the operation and the controlling of automatic apparatus of the character above set forth, the present invention provides an organization in which the several power-operated mechanisms may be operated hydraulically with liquid from the same source as that used for impregnating the work.

Another improvement which is a feature of the present invention is provided by an endless hydraulic circuit in which the liquid is used repeatedly, with replenishment as needed, not only to operate the several power-operated mechanisms but also to impregnate the work.

The invention also provides improved means for securing or locking the closure in pressure-tight relationship to the receptacle in which the work is impregnated, and improved means for timing the release of pressure in the impregnating chamber prior to unlocking or releasing the closure.

Still another feature of the invention consists in an organization comprising a hydraulic master unit operated by liquid from the common source to furnish the power by which a distributing valve is operated repeatedly in each cycle to supply operating liquid to the other hydraulic units and to the impregnating chamber as required. In addition to operating the distributing valve, the hydraulic master unit is utilized to operate an electric circuit-selector by which the several operating circuits of an electrical controlling system are brought into potentially operative condition successively in timed relation to successive operating movements of the distributing valve. This combination of elements provides improvements in the means for automatically controlling the successive operations in a cycle, in that each successive movement of the distributing valve is accompanied by a corresponding movement of the circuit-selector to coordinate the controlling circuits with the progress of the cycle.

Figures 2, 16:
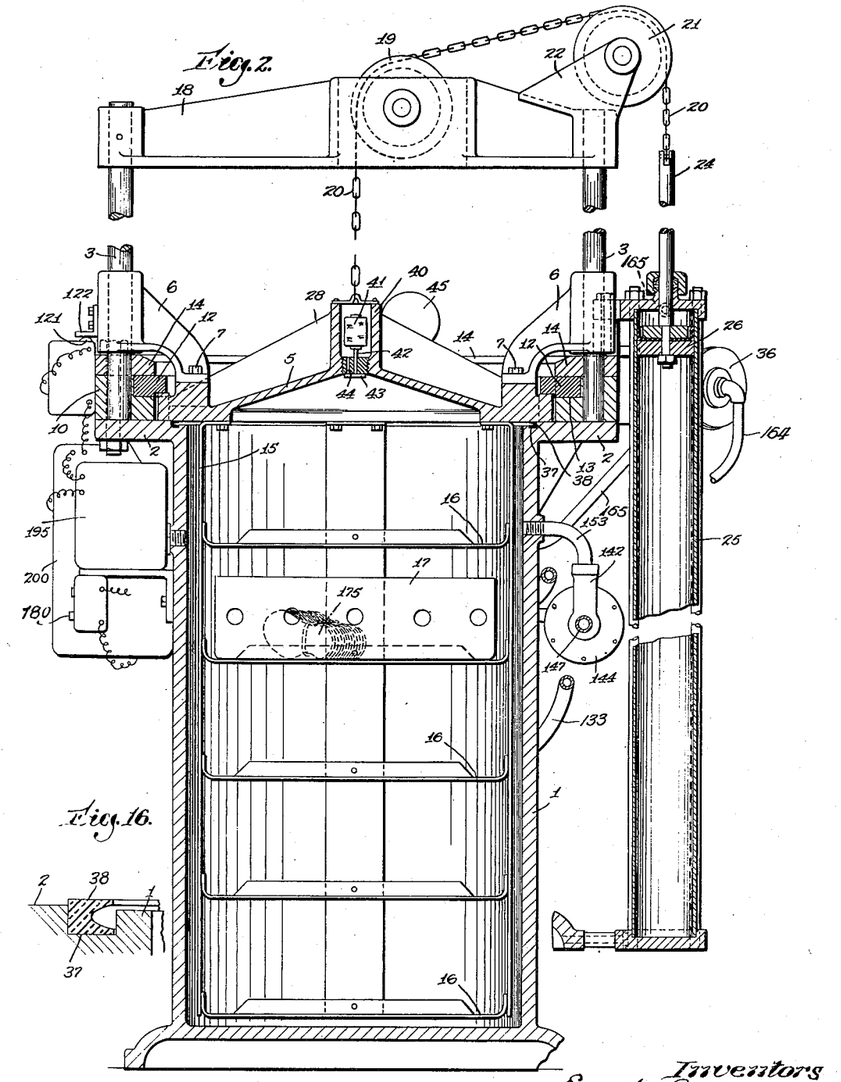
Fig. 2 is a vertical section of the apparatus viewed in the opposite direction, the parts being in the positions occupied when treatment of the work is in progress.
Fig. 16 (see the sheet bearing Fig. 2) is a vertical section including a fragment of the treatment receptacle and a gasket with which the closure cooperates.
Figure 14:
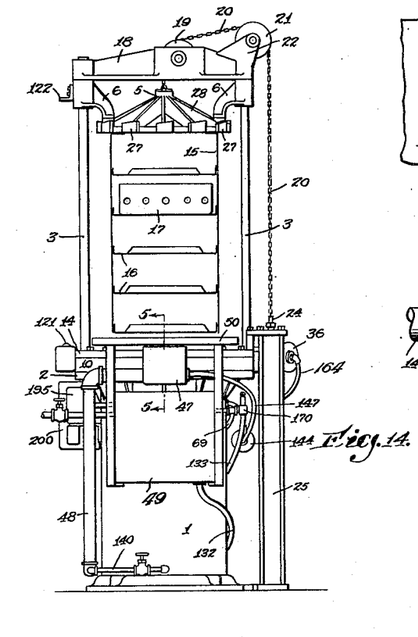
Fig. 14 is a front elevation on a smaller scale of the entire apparatus, the closure and the work-supporting means carried thereby being retracted from the receptacle and standing in their initial positions.

The illustrated apparatus (Figs. 2 and 14) comprises a pressure-sustaining treatment receptacle 1 of cylindrical form that stands on end and is provided at its upper end with a horizontally projecting flange 2 to which are affixed, at diametrically opposite points, two vertical guide rods 3. A vertically movable closure 5 is provided with brackets 6 affixed thereto by bolts 7. The receptacle 1 and the closure 5 are designed to form a pressure-sustaining chamber in which the work may be immersed and impregnated. The rods 3 extend through these brackets to guide the closure to and from its operative position on the receptacle. The upper ends of the rods 3 are connected and braced by a stationary cross-piece 18 (Figs. 2 and 14). The cross-piece supports wheels 19 and 21 over which a chain 20 passes to provide for raising and lowering the closure, the wheel 21 being mounted in an extension 22 of the cross-piece.

The outlying end of the chain 20 is connected to a piston-rod 24 that projects from a piston 26 arranged in a hydraulic cylinder 25. Water under pressure is forced into the cylinder 25 above the piston to retract the closure 5 from the receptacle, but the weight of the closure and the load carried thereby causes the closure to descend under the force of gravity and thereby expel the water from the upper end of the cylinder through the conduit by which the water is supplied thereto.

The work-supporting means carried by the closure comprises hangers 15, shelves 16 affixed thereto, and one or more perforated trays or boxes 17 placed on the shelves and containing the articles to be treated, for example, bundles of leather soles 175.

Figure 3:
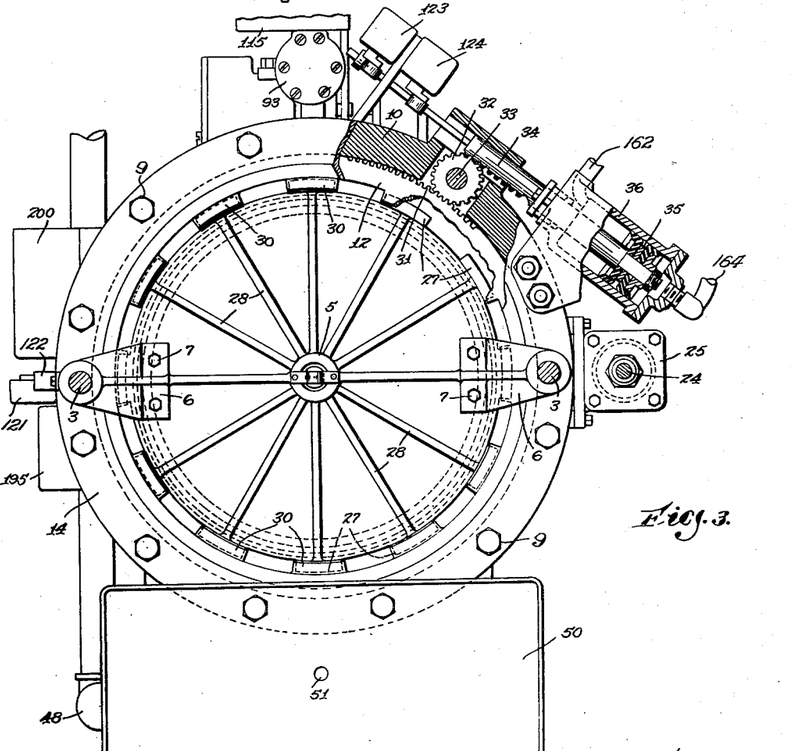
Fig. 3 is a top-plan view of the treatment receptacle, a portion of which is broken away and shown in section to illustrate the mechanism for securing and releasing the closure.
Figure 4:
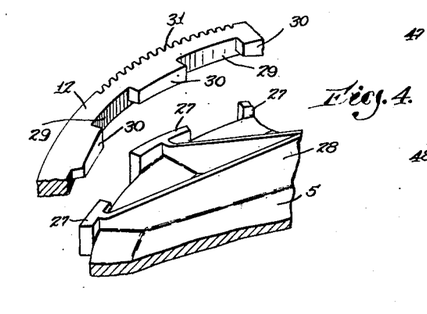
Fig. 4 is a perspective view of portions of the closure and a locking ring by which it may be secured in pressure-tight relationship to the receptacle.

The means for securing the closure 5 to the receptacle comprises two stationary rings 10 and 14 and a movable ring 12, all in concentric relation to the receptacle, the rings 10 and 14 being affixed to the flange 2 by bolts 9 (Fig. 3). As shown in Fig. 2, the ring 10 is rabbeted to provide a circular groove 13 to receive the movable ring 12. As shown in Figs. 3 and 4, the ring 12 is provided with a circular series of internal lugs 30 spaced apart by gaps 29 through which lugs 27 formed on the periphery of the closure 5 may pass. The upper faces of the lugs 27 and the lower faces of the lugs 30 are correspondingly inclined to operate with a wedging effect when the ring 12 is rotated to cause cooperation of the lugs. The ring 12 thus locks the closure and the wedging effect of the lugs forces the closure tightly against a flexible gasket 38 (Fig. 16) embedded in a groove 37 in the upper face of the receptacle. The closure is preferably provided with reinforcing ribs 28.

The perimeter of the locking ring 12 is provided with a segment of gear teeth 31 whereby to-and-fro rotary motion of the ring may be derived from a pinion 32 (Fig. 3) arranged in a recess in the stationary ring 10 and connected to that ring by a pivot-pin or stud 33. This pinion receives rotation from rack-teeth formed on a piston-rod 34 that projects from a hydraulic cylinder 36 and is provided with a piston 35 in the cylinder. When water under pressure is supplied to the left-hand end of the cylinder, through pipe 162, it imparts locking movement to the ring 12, but when water is supplied to the opposite end of the cylinder it causes the locking ring to release the closure and places the gaps 29 of that ring in register with the lugs 27 of the closure so that the latter may be retracted from the receptacle.

Figure 15:
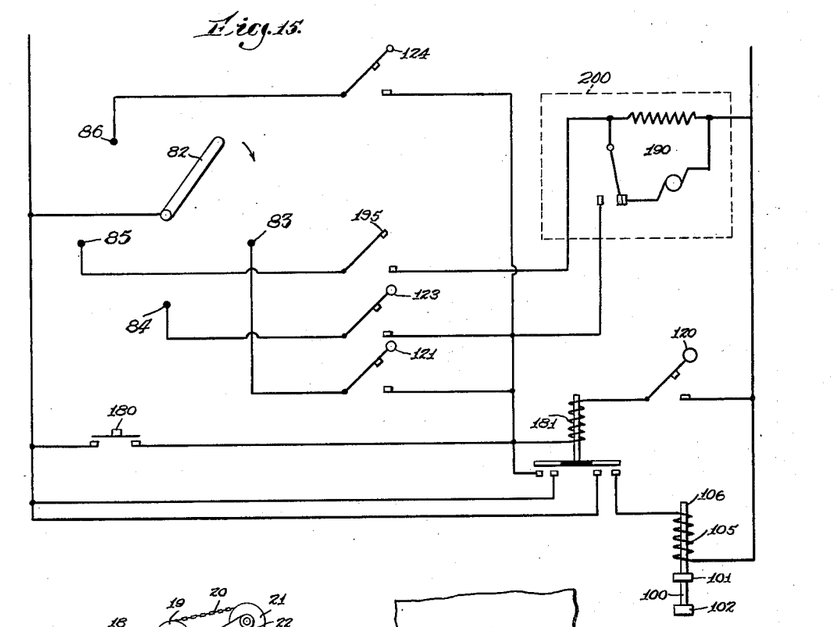
Fig. 15 is a wiring diagram of the electrical circuits by which the various operations in each cycle are automatically brought about.

The piston-rod 34 is also utilized to operate alternately two electrical circuit closers 123 and 124 that normally stand open as shown in Fig. 15. When the piston-rod 34 has about completed the tightening movement of the ring 12 it operates the closer 123 and thereby causes a valve mechanism to supply water under pressure to the treatment receptacle, but when, subsequently, the piston-rod has about completed the releasing movement of the ring it operates the closer 124 and thereby causes the valve mechanism to supply water under pressure to the cylinder 25 by which the closure and the work-supporting means are retracted from the receptacle.

In the course of a cycle of automatic operations the closure 5 is secured to the treatment receptacle before the latter is entirely filled with water. Consequently, to provide for releasing all the air from the closed receptacle, to the end that the latter may be entirely filled with water, the closure is provided with an automatic venting device of the type shown in Fig. 2. This device comprises a cup 40 in the center of the closure to provide a chamber for a float 41. A stem 42 carried by the float 41 extends downwardly through the bottom of the cup and is provided with a head or washer 43, the purpose of which is to close a venting port 44 that extends through the bottom of the cup. The float 41 rests initially on the bottom of the cup and thereby causes the washer 43 to stand away from the port 44. Consequently, while water is flowing into the receptacle it expels the air through the port 44 until finally all the air is expelled and water flows through the port, enters the cup and raises the float and the washer 43, thereby automatically closing the port 44 to prevent the escape of liquid and to maintain the pressure to which the water in the receptacle is subsequently subjected.

Figure 5:
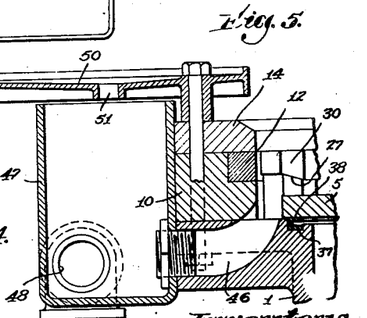
Fig. 5 is a vertical section including fragments of the treatment receptacle and the closure, an overflow and drainage receptacle, and a draining table on which the treated work may be placed while surplus treating liquid drains therefrom. The direction of view is indicated by line 5—5 in Fig. 14.
Figure 6:
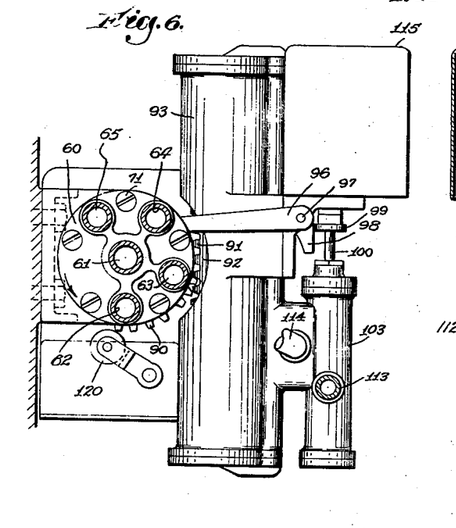
Fig. 6 is an elevation of a hydraulic master unit and a valve assemblage by which the treating and operating liquid is automatically controlled and distributed, the direction of view being from left to right with respect to the showing of the same assemblage in Fig. 1.

If, while the work is being lowered into the receptacle, it causes any overflow of the water initially contained therein, such overflow will be carried off through a port 46 (Fig. 5), by which it is delivered into an overflow receptacle 47 from which it may drain through a conduit 48 to any convenient point of discharge. The draining receptacle 47 is open at the top but is overhung by a draining table 50 on which the treated work may stand while the surplus water drains therefrom. This water will flow through a drain 51 in the table and thence through the receptacle 47 and the draining conduit 48.

Although the illustrated impregnating apparatus is capable of operation with water-pressures supplied from a street main or from an elevated storage tank, it is preferred to utilize an endless hydraulic circuit including a pump to avoid wasting liquid and to provide for use of the apparatus during interruptions in the supply of liquid from a remote source. Moreover, the pump in the endless circuit may provide higher pressures not only for the treatment of the work but also for the operation of the various hydraulic operating units with which the apparatus is equipped.

Figure 1:
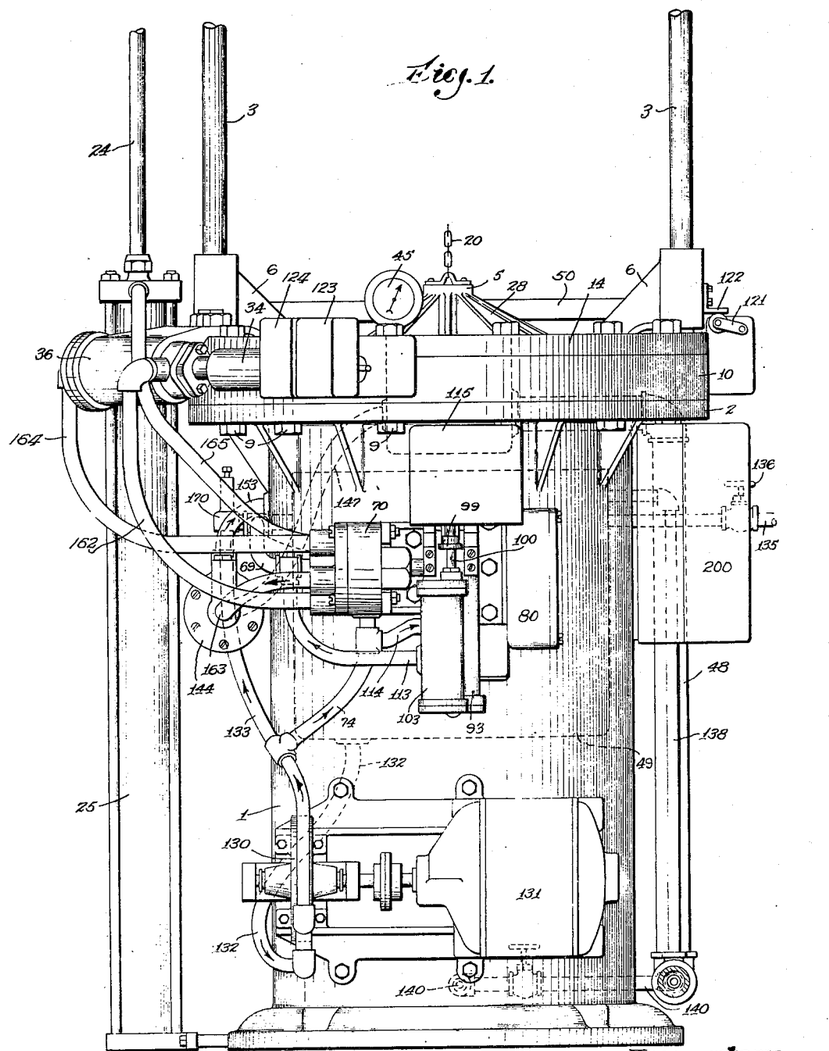
Fig. 1 is a rear elevation of a treating apparatus constructed in accordance with the present invention, the closure of the treatment receptacle being applied thereto and the upper portion of the apparatus being omitted.

As shown in Fig. 1, a water pump 130 is coupled to and driven by a motor 131 that operates continuously so long as the apparatus is in use, including the intervals when the closure of the receptacle is elevated to permit removal of treated work and the placing of untreated work on the shelves suspended from the closure. The pump 130 maintains circulation of water through a hydraulic circuit comprising a reservoir 49, a feed pipe 132 through which the water flows to the intake side of the pump, and a return pipe 133 that leads from the output side of the pump to the upper portion of the same reservoir. The return pipe 133 is preferably provided with a pressure-regulating valve 170. The water under pressure in the pipe 133 is utilized to operate the various hydraulic units and to treat the work in the receptacle 1.

The water for this hydraulic circuit may flow into the reservoir 49 from any convenient source, such as a street main, through a supply pipe 135 and a shut-off valve 136. To maintain a constant supply of water in this circuit, the reservoir 49 is preferably provided with a ball-cock or equivalent float-operated valve (not shown) which, if used, will provide for leaving the valve 136 open.

Still referring to Fig. 1, a supply pipe 74 forms connection between the high-pressure pipe 133 and a valve-casing 70, while a branch 114 of the pipe 74 supplies some of the water to a cylinder 103. The casing 70 contains a rotary distributing valve through which the water is supplied to the treatment receptacle 1 and to the hydraulic cylinders 25 and 36, while the cylinder 103 contains a duplex pilot valve that controls the operation of the distributing valve. Moreover, a drain pipe 69 returns water from the casing 70 to the reservoir 49, and for this purpose it is connected with the return pipe 133 at a point between the reservoir and the pressure-regulating valve 170. Used water is returned from the cylinder 103 to the reservoir through pipe 113 and return pipe 69.

Figure 8:
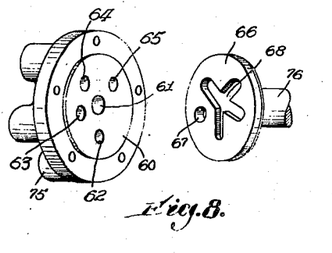
Fig. 8 is a perspective view including a rotary distributing valve and the stationary seat member with which it cooperates to control the distribution of the liquid.
Figure 9:
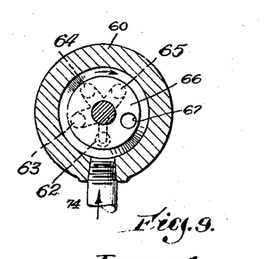
Fig. 9 is a vertical section through the casing of the distributing valve, the direction of view being the same as that of Fig. 7.
Figure 11:
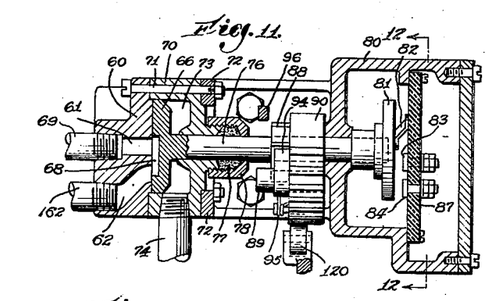
Fig. 11 is a vertical section through an assemblage including the distributing valve and an electrical circuit-selector that controls the distribution of electric current to various controlling circuits by which the several operations included in a cycle are automatically brought about in a predetermined sequence, the plane of the section being indicated by line 11—11 in Fig. 7. The direction of view is the same as that of Fig. 1.

The construction of the distributing valve is shown best in Figs. 8, 9 and 11. The rotor 66 of this valve cooperates with a valve-seat member 60 in which distributing ports 62, 63, 64 and 65 are arranged in a circular series and spaced one from another, a distance corresponding to one-fifth of a cycle of rotation, except the ports 65 and 62 between which the space is equivalent to two-fifths of a cycle to provide a blank spot corresponding to one station of the rotor. The rotor is provided with a supply port 67 arranged to be placed successively in register with the distributing ports 62, 63, 64 and 65, and at one station in register with the blank spot between the ports 65 and 62. The supply port 67 stands initially in register with the port 65 to supply water to the cylinder 25 whereby the closure 5 is retracted and maintained in its retracted position while the attendant removes the treated work from the shelves 16 and places untreated work thereon. This station of the supply port is its initial station and is likewise the final station of a cycle of operations.

Figure 7:
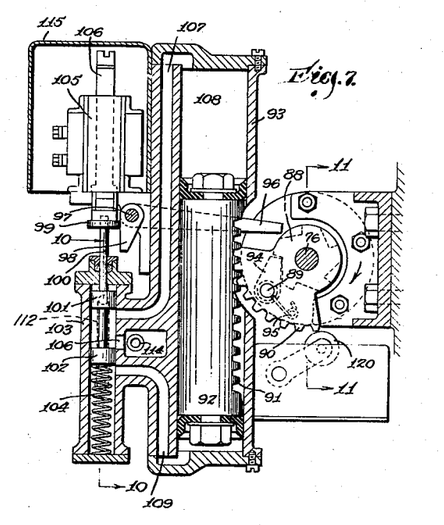
Fig. 7 is a vertical section through the assemblage shown in Fig. 6 but viewed in the opposite direction.

Mechanism to be described rotates the valve member 66 in a clockwise direction as indicated by arrows in Figs. 7 and 9, the steps of rotation being of equal angular extent and five steps being required to complete a cycle. The first step of a cycle shifts the supply port 67 to the blank spot of the member 60 (Fig. 9), whereupon the force of gravity causes the closure 5 to descend, thereby expelling the water from the upper end of the cylinder 25 through pipe 165, port 65, draining channel 68 in the rotor 66 and thence through a central draining port 61 and return pipe 69 to the reservoir 49.

The second step of the rotor 66 shifts the supply port 67 into register with the distributing port 62, whereupon the water flows through a pipe 162 to the cylinder 36 (Fig. 3) and thereby operates the piston 35 to secure the closure tightly against the receptacle. Fig. 3 illustrates the result of this operation. While the piston 35 is operating for this purpose it expels used water from the opposite end of the cylinder through pipe 164, distributing port 64, draining channel 68, draining port 61, return pipe 69 and thence to the reservoir 49.

The third step of the rotor 66 shifts the port 67 into register with the distributing port 63. The water from the supply now flows through the supply port 67, distributing port 63, pipe 163, through a chamber 148 (Fig. 13) of a pressure-responsive valve, past a check valve 150, through a port 151 and thence through a pipe 153 which delivers it into the receptacle 1. This line of communication is maintained not only to fill the treatment receptacle with water but also to develop tempering pressure of the water for a predetermined length of time governed by a timing device.

At the termination of the allotted tempering period, the timing device causes the fourth step of the rotor 66 whereby the supply port 67 is shifted into register with the distributing port 64. The water from the distributing valve now flows through the supply port 67, distributing port 64, pipe 164 and enters the right-hand end of the cylinder 36 (Fig. 3) to release the closure 5 from the treatment receptacle. As the piston 35 travels toward the left-hand end of the cylinder 36, it expels the used water ahead of it through the pipe 162, the distributing port 62 (Fig. 8), the draining channel 68, the draining port 61, the return pipe 69, and thence into the reservoir 49.

As the piston 35 (Fig. 3) completes its releasing movement it operates the circuit closer 124 and thereby causes the rotor 66 of the distributing valve to shift the supply port 67 into register with the distributing port 65. Now the water from the distributing valve flows through the supply port 67, distributing port 65, and pipe 165 by which it enters the cylinder 25 to retract the closure and the work-supporting means from the treatment receptacle, the cycle being completed and all operation suspended when the parts occupy the positions shown in Fig. 14.

The draining channel 68 (Figs. 8 and 9) has four radial branches, all meeting near the center of the rotor 66. One of these branches drains the cylinder 25 at the end of the first step of a cycle; another drains one end of the cylinder 36 at the end of the second step; still another drains the other end of the cylinder 36 at the end of the fourth step; and the fourth branch permits free travel of the piston 35 in the cylinder 36 for manual testing of the locking mechanism when the rotor 66 stands in the position represented in Fig. 9.

For the purpose of operating the rotor 66 as above explained, this member is provided with a central stem 76 (Figs. 7 and 11). A ratchet-wheel 88 affixed to this stem is provided with five equally spaced teeth shown in dotted lines in Fig. 7. The ratchet-wheel is driven one tooth at a time by a pawl 94 connected by a pivot stud 89 to an oscillatory gear segment 90 loosely mounted on the stem 76. A spring 95 maintains the pawl in contact with the ratchet-wheel. The gear segment 90 is oscillated by rack-teeth 91 formed on a plunger 92 that plays up and down in a hydraulic cylinder 93, the ends of the plunger being provided with washers that constitute piston heads. The cylinder 93 and its plunger 92 provide a master hydraulic unit by which all operations are initiated. When the parts of this mechanism stand in their initial position as shown in Fig. 7, the gear segment 90 depresses a circuit breaker 120 by which an electrical operating circuit is initially closed at this point although it may be open at other points.

Water for reciprocating the plunger 92 is supplied to the cylinder 93 from the hydraulic pressure circuit hereinbefore described, but before such water can enter the cylinder 93 it must flow through the adjoining cylinder 103 of the pilot-valve. The water thus utilized enters the cylinder 103 through a port 106 to which it is supplied by the pipe 114. The supply port 106 is between two distributing ports 107 and 109.

Figure 10:
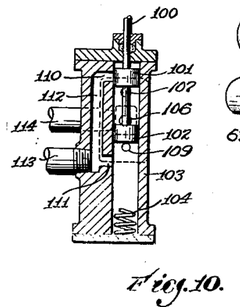
Fig. 10 is a vertical section through the pilot valve that controls the liquid by which the master unit and the distributing valve are automatically operated, the direction of view being the same as that of Fig. 1. See line 10—10 of Fig. 7.

When the pilot valve is in its initial position, as shown in Figs. 7 and 10, the valve member 101 covers a draining port 110 but uncovers the distributing port 107. Consequently, water from the supply port 106 may flow through the port 107 into the upper end 108 of the operating cylinder 93 and thereby return the plunger 92 to its initial position shown in Fig. 7. At the same time, water in the lower end of the cylinder 93 may be expelled through the port 109, into the lower portion of the cylinder 103 and thence through a draining port 111 (Fig. 10).

On the other hand, when the pilot valve is depressed to the lower limit of its range of travel the valve member 101 uncovers the drain port 110 and stands between the port 107 and the supply port 106. At the same time, the valve member 102 stands below the port 109 so that water from the supply port 106 may then flow into the lower end of the operating cylinder 93 to move the distributing valve 66 one step ahead. As the plunger 92 rises, it expels the water from the upper end of the cylinder 93 through port 107, cylinder 103 and drain port 110. The two drain ports 110 and 111 are connected by a duct 112 having an outlet into the return pipe 113 which conducts the drainage back to the reservoir 49.

To insure full travel of the operating piston 92 the stem 100 of the pilot valve is provided with a collar 99 arranged to be caught by a detent 98 when the pilot valve is depressed to its lower limit. A tripping arm 96 is rigidly connected with the detent 98 by a rock-shaft 97, these three elements forming, in effect, a bell crank. The weight of the arm 96 is sufficient to move the detent to its operative position over the collar 99 when the latter is fully depressed. The pilot valve therefore remains at the lower limit of its travel until the operating plunger 92 has completed its operating stroke, whereupon the stud 89, which projects a considerable distance beyond the pawl 94 lifts the tripping arm 96 and thereby releases the pilot valve. Now the spring 104 returns the pilot valve to its initial position thereby supplying water to the upper end of the cylinder 93 and draining the water from the lower end thereof.

From the foregoing it will be clear that each complete cycle of rotation of the distributing valve 66 requires five down strokes and five up strokes of the pilot valve. The first operation of the pilot valve in each cycle of operations requires manual operation of a push-button switch 180 in an electrical controlling circuit, but all the other operations of the pilot valve are effected automatically at the completion of the individual steps or operations included in a cycle of operations. Accordingly, the upper end of the valve stem 100 is connected to the core 106 of a solenoid 105 which, when energized, depresses the core and the pilot valve.

Figure 12:
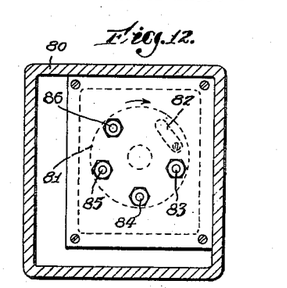
Fig. 12 is a vertical section of the structure intersected by line 12—12 of Fig. 11.

To coordinate the control of the electrical circuits in accordance with the successive movements of the distributing valve 66, the stem 76 of this valve is provided with a carrier 81 (Figs. 11 and 12) on which an electrical contact brush 82 is mounted. As this brush is carried step by step with the valve 66 it dwells in engagement successively with four stationary electrical contacts 83, 84, 85 and 86. These stationary contacts are supported by a plate 87 of insulating material, enclosed in a casing 80. When the brush 82 stands in its initial position as shown in Fig. 12, it is ineffective since the electrical means has no stationary contact to be engaged by the brush at that station. Consequently, automatic operation of the apparatus must cease at the completion of each cycle of operations and manual operation of the circuit closer 180 (Fig. 15) is therefore necessary to initiate each cycle of operations.

The contact brush 82 of the rotary circuit-selector is also represented in its initial position in Fig. 15. The circuit that includes the manual starting switch 180, and the four circuits that lead respectively from the stationary contacts 83, 84, 85 and 86 are all connected to the solenoid 181 of a relay through which operating current is supplied to the solenoid 105 of the pilot valve, but the solenoid 181 cannot be energized except when the circuit breaker 120 is closed by the operating segment 90 in its initial position as shown in Fig. 7.

A cycle of operations is initiated by closing the manual starting switch 180 to energize the solenoid 181. The relay switch now supplies current to the solenoid 105, thereby operating the pilot valve. The hydraulic plunger 92 now places the brush 82 on the contact 83 of an initially open circuit and at the same time shifts the supply port 67 of the distributing valve to the station shown in Fig. 9. Now the water in the cylinder 25 (Fig. 14) is released and the closure 5 descends with the work supported thereby. While this is occurring, no current flows through the distributing circuit of the contact 83 because that circuit is initially open at a point controlled by a circuit closer 121, but when the closure 5 reaches the lower limit of its travel a lug 122 carried thereby (see upper right of Fig. 1) depresses the circuit closer and thereby supplies current once more to the solenoid 181.

Again, the relay switch supplies current to energize the solenoid 105 that operates the pilot valve, and again, the plunger 92 is operated, this time to shift the supply port 67 into register with the port 62 and at the same time to transfer the brush 82 to the contact 84 of the next circuit to be utilized. Now, the water flows through the distributing port 62 and the pipe 162 to the cylinder 36, thereby operating the ring 12 to secure the closure in pressure-tight relationship to the treatment receptacle. At the completion of this securing operation the piston-rod 34 operates the circuit closer 123, thereby supplying operating current once again to the solenoid 181 of the relay switch.

The latter again supplies operating current to the solenoid 105 of the pilot valve, whereupon the distributing valve is advanced another step to carry the supply port 67 into register with the distributing port 63. This movement also transfers the brush 82 to the contact 85. Water now flows through the distributing port 63, the pipe 163, the chamber 148 (Fig. 13), the port 151 and the pipe 153 to fill the treatment receptacle with water and to raise the pressure of the water therein to the maximum degree permitted by the regulating valve 170 (Fig. 1). When the pressure in the treatment receptacle has been developed sufficiently for tempering it operates a pressure-responsive switch 195 (Fig. 2 left and Fig. 15) by which the circuit of terminal 85 is closed to supply operating current to an electrical timing device 190 contained in a casing 200.

The effect of this timing device is to prolong the period of maximum pressure in the treatment receptacle for a predetermined length of time, at the termination of which the timing device interrupts its own operating circuit and supplies the operating current derived from the contact 85 to the solenoid 181 of the relay switch.

Again, as before, the solenoid 105 of the pilot valve is energized, the distributing valve is advanced another step to carry the supply port 67 into register with the distributing port 64, and the contact brush 82 is transferred to the stationary terminal 86. Now the water from the supply port 67 flows through the distributing port 64 and the pipe 164 to the cylinder 36 (Fig. 3) to release the closure 5 by returning the ring 12 to its initial position. At the completion of this operation the piston-rod 34 operates the circuit closer 124 by which the circuit of terminal 86 is closed to supply operating current again to the solenoid 181 of the relay switch.

Once more this switch supplies operating current to the solenoid 105 of the pilot valve which now causes the distributing valve 66 to advance to its final station at which the supply port 67 stands in register with the distributing port 65. At the same time the contact brush 82 is transferred to its initial position, as shown in Figs. 12 and 15, where it is no longer effective to supply operating current.

The supply port 67 being now at its final station of a cycle of operations directs the water through distributing port 65 and pipe 165 to the cylinder 25, thereby causing retraction of the closure 5 and the work-supporting means to their initial positions as shown in Fig. 14.

Figure 13:
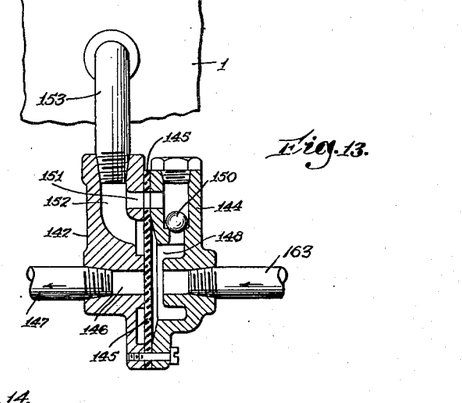
Fig. 13 includes a fragment of the treatment receptacle in elevation and a vertical section of an automatic pressure-responsive valve through which treating liquid is supplied to and drained from the receptacle, this valve appearing at the left of the receptacle in Fig. 1.

Referring to the pressure-responsive valve mechanism shown in Fig. 13, when the water flows through the pipe 163 to fill the treatment receptacle 1 and to develop tempering pressure therein it impinges against a flexible diaphragm 145 which normally closes a draining port 146, the water then having no escape from the chamber 148 except to flow to the treatment chamber in the receptacle. Movement of the diaphragm 145 away from the draining port 146 requires a reduction of pressure in the chamber 148 below the pressure against the opposite face of the diaphragm. Such a reduction of pressure occurs when the draining channel 68 in the distributing valve (Fig. 8) is moved into register with the port 63 at the conclusion of the tempering period, the pressure in the pipe 163, in the receptacle 1 and in the pressure switch 195 being thereby relieved.

At this point in the cycle, the check valve 150 (Fig. 13) prevents the pressure in the treatment receptacle from acting against the supply side of the diaphragm 145. The outflowing water is therefore conducted through port 152, draining port 146, draining pipe 147, overflow receptacle 47 (Fig. 14), and draining pipe 48. The quantity of water thus drained from the receptacle, while not great, insures a supply of fresh water in each cycle for replenishing. This release of pressure in the treatment receptacle occurs simultaneously with the beginning of the operation by which the ring 12 is moved to release the closure 5, and not only facilitates the releasing movement of the ring but also avoids spurting of the water between the closure and the receptacle when the closure is released.

If desired, the closure 5 may be provided with a gage 45 (Figs. 1 and 2) to indicate the pressure developed in the receptacle.

Having thus described our invention, what we claim as new and desire to secure by Letters Patent of the United States is:

1. Apparatus for treating articles under fluid pressure, comprising a receptacle and a movable cover, mechanism automatically actuated to move said cover and to clamp it to said receptacle in pressure-tight relationship, means to build up pressure within said covered receptacle, a timing element governed by pressure developed in said receptacle, and fluid pressure means controlled by said timing element to release said cover at the conclusion of a measured period of time.

2. Apparatus for treating a plurality of articles simultaneously with a predetermined fluid pressure, comprising a receptacle and a movable cover, mechanism automatically actuated to close said cover and to clamp it to the receptacle in pressure-tight relationship, and means to create predetermined pressure on the articles being treated within said receptacle and thereafter to unclamp the cover, the cover-closing, clamping, and unclamping actions being automatically imparted by the pressure generating fluid in predetermined timed relationship.

3. Apparatus for treating articles under fluid pressure, comprising a pressure-tight receptacle and a removable cover, a source of hydraulic pressure adapted to build up the pressure in said receptacle, including means hydraulically actuated to apply the cover to the receptacle, to clamp the cover to the receptacle in pressure-tight relationship, to unclamp said cover and to remove the same, in association with a means cooperating in controlling said successive actions in predetermined timed relationship.

4. Apparatus for treating articles under fluid pressure, comprising a pressure-tight receptacle and a removable cover, a source of hydraulic pressure adapted to build up the pressure desired in said receptacle, and means hydraulically actuated to apply the cover to the receptacle, to clamp the cover to the receptacle in pressure-tight relationship, to unclamp said cover and to remove the same in association with electrically actuated means cooperating in controlling said successive actions.

5. Apparatus for treating articles under fluid pressure, comprising a pressure-tight receptacle and a removable cover, a source of hydraulic pressure adapted to build up the pressure desired in said receptacle, means hydraulically actuated to apply the cover to the receptacle, to clamp the cover to the receptacle in pressure-tight relationship, to unclamp said cover and to remove the same, in association with electrically actuated means cooperating in controlling said successive actions prepared in advance of each mechanical action, and operated by the completing of the preceding mechanical action of the apparatus.

6. Apparatus for treating articles under fluid pressure comprising a pressure-tight receptacle with an open top, a removable cover adapted to be applied to said open top in pressure-tight relationship, means for supplying an operating fluid under pressure, fluid pressure means effective to lower and raise said cover, fluid pressure means to lock and unlock said cover, power-actuated means for directing the operating fluid to lower the cover, to lock the cover, to treat the work in the receptacle, to unlock the cover and to raise the cover.

7. Apparatus for treating articles with liquid comprising a pressure-tight treatment receptacle with an open top, a removable cover adapted to be applied to said open top in pressure-tight relationship, a source of treating liquid under pressure, hydraulic means effective to lower and raise said cover, hydraulic means arranged to lock and unlock said cover, and power-actuated means arranged to control the flow of liquid from said source to and from both of said hydraulic means and to said receptacle, to lower and lock the cover, to treat the work and to unlock and raise the cover.

8. Apparatus for treating articles under fluid pressure comprising a treatment receptacle and a removable cover for closing said receptacle, fluid pressure mechanism arranged to lock and unlock said cover, a source of fluid under continuous pressure, and automatic means to establish communication from said source to said mechanism, said receptacle and said mechanism successively to lock the cover, to treat the work in the receptacle and to unlock the cover.

9. Apparatus for treating articles under fluid pressure comprising a treatment receptacle and a removable cover for closing said receptacle, fluid pressure mechanism arranged to operate said cover, means including a power-operated pump to supply fluid and pressure thereof to operate said mechanism and to treat the work in said receptacle when the cover is applied thereto, and power-operated means for controlling the fluid and pressure from said pump first to apply the cover, thereafter to develop treatment pressure in said receptacle, and thereafter to retract the cover, said controlling means including a timing element by which a measured period of time is allotted to maintain fluid pressure within the receptacle for treating articles therein.

10. Apparatus for treating articles under fluid pressure comprising a treatment receptacle and a removable cover for said receptacle, fluid pressure means for operating said cover, fluid pressure mechanism to lock and unlock said cover, means to supply operating fluid under pressure to said receptacle when the cover is locked thereto, power-operated means arranged to direct the operating fluid thereafter to said fluid pressure mechanism and to said cover-operating means successively to unlock and retract the cover, and a timing device by which said power-operated means is controlled to allot a measured period of time to treatment of the work in said receptacle before directing the operating fluid to said unlocking mechanism.

11. In apparatus for treating articles under fluid pressure for a predetermined length of time in a receptacle having a removable cover, mechanism automatically actuated to close the cover, to lock the cover to the receptacle in pressure-tight relationship, to build up fluid pressure therein, to maintain said pressure to a desired extent, to unlock and to remove the cover, and hydraulic mechanisms to activate said operations in sequence, the completion of each operation predetermining the action of the hydraulic mechanism for the next succeeding operation.

12. In apparatus for treating articles under fluid pressure for a predetermined length of time in a receptacle having a removable cover, means suspended from the cover to carry the articles into said receptacle, mechanisms automatically actuated to close the cover, to lock the cover to the receptacle in pressure-tight relationship, to build up fluid pressure therein, to maintain said pressure to a desired extent, to unlock and to remove the cover, and hydraulic mechanisms to activate said operations in sequence, the completion of each operation predetermining the action of the hydraulic mechanism for the next succeeding operation.

13. In apparatus for treating articles under fluid pressure, a receptacle to contain articles and the fluid under pressure, a source of hydraulic pressure associated with said receptacle, means hydraulically actuated to close the receptacle pressure-tight and thereafter to build up pressure therein to a predetermined degree, and means automatically operating to stop the pressure, to release the pressure and to open the receptacle, each operation being controlled by the completion of the preceding operation.

14. In apparatus for treating articles under fluid pressure, a receptacle to contain articles and the fluid under pressure, a source of hydraulic pressure associated with said receptacle, means hydraulically actuated to close the receptacle pressure-tight and thereafter to build up pressure therein for a predetermined time, and means automatically operating to stop the pressure, to release the pressure and to open the receptacle, each operation being controlled by the completion of the preceding operation.

15. In apparatus for treating articles under fluid pressure, a receptacle to contain articles and the fluid under pressure, a source of hydraulic pressure associated with said receptacle, means hydraulically actuated to close the receptacle pressure-tight and thereafter to build up pressure therein to a predetermined degree and for a predetermined time, and means automatically operating to stop the pressure, to release the pressure and to open the receptacle, each operation being controlled by the completion of the preceding operation.

16. A hydraulic apparatus comprising a receptacle and a removable closure designed to form a pressure-sustaining impregnating chamber, a source of impregnating liquid above atmospheric pressure, hydraulic means arranged to operate said closure, and controlling means arranged to supply liquid from said source, under the pressure existing therein, successively to said hydraulic means and to said chamber.

17. A hydraulic apparatus as defined in claim 16 and comprising also a hydraulic master unit operated by liquid from said source to operate said controlling means and thereby to supply the liquid for operating the closure and the liquid for impregnating the work in said chamber.

18. A hydraulic apparatus comprising a receptacle and a removable closure designed to form a pressure-sustaining impregnating chamber, a source of impregnating liquid above atmospheric pressure, hydraulic means arranged to lock said closure in pressure-tight relationship to said receptacle, and controlling means arranged to supply liquid from said source, under the pressure existing therein, successively to said hydraulic means and to said chamber.

19. A hydraulic apparatus comprising a receptacle and a removable closure designed to form a pressure-sustaining impregnating chamber, a source of impregnating liquid above atmospheric pressure, hydraulic means arranged to retract said closure from said receptacle, and controlling means arranged to supply liquid from said source, under the pressure existing therein, successively to said chamber and to said hydraulic means.

20. A hydraulic apparatus comprising a receptacle and a removable closure designed to form a pressure-sustaining impregnating chamber, a source of impregnating liquid above atmospheric pressure, locking means arranged to lock said closure in and release it from pressure-tight relationship to said receptacle, double-acting hydraulic means arranged to impart locking and unlocking movement to said locking means, and controlling means arranged to supply liquid from said source, under the pressure existing therein to the locking side of said hydraulic means, thereafter to said chamber, and thereafter to the unlocking side of said hydraulic means.

21. A hydraulic apparatus as defined in claim 20 in which said controlling means includes a hydraulic master unit operated by liquid from said source to supply the liquid for locking the closure, the liquid for impregnating the work and the liquid for unlocking the closure.

22. A hydraulic apparatus comprising a receptacle and a removable closure designed to form a pressure-sustaining impregnating chamber, a source of impregnating liquid above atmospheric pressure, double-acting hydraulic means arranged to secure said closure in and release it from pressure-tight relationship to said receptacle, hydraulic means arranged to retract said closure from the receptacle, and controlling means arranged to supply liquid from said source to the securing side of said double-acting means, thereafter to said chamber, thereafter to the releasing side of said double-acting means, and thereafter to said means for retracting the closure.

23. A hydraulic apparatus comprising a receptacle and a removable closure designed to form a pressure-sustaining impregnating chamber, a source of impregnating liquid above atmospheric pressure, a valve arranged to supply liquid from said source to said impregnating chamber, a hydraulic unit arranged to operate said valve, a pilot valve arranged to supply liquid from said source to operate said hydraulic unit, and automatic means arranged to operate said pilot valve.

24. A hydraulic apparatus comprising a receptacle and a removable closure designed to form a pressure-sustaining impregnating chamber, a source of impregnating liquid above atmospheric pressure, hydraulic means arranged to operate said closure, hydraulic means arranged to secure and release said closure, a distributing valve arranged to supply liquid from said source successively to each of said hydraulic means and to said impregnating chamber in a predetermined sequence, a hydraulic master unit arranged to operate said distributing valve according to said sequence, a pilot valve by which liquid from said source is supplied to operate said master unit, and automatic means arranged to operate said pilot valve.

25. A hydraulic apparatus comprising a receptacle and a removable closure designed to form a pressure-sustaining impregnating chamber, means forming an endless hydraulic circuit to contain impregnating liquid and including a pump to circulate the liquid and develop pressure thereof, hydraulic means arranged to operate said closure, means including a valve arranged to supply liquid from said circuit to operate said hydraulic means and to return used liquid therefrom to said circuit, and valve-controlled means arranged to supply liquid from said circuit to said impregnating chamber.

26. A hydraulic apparatus as defined in claim 25 comprising also hydraulic means arranged to secure and release said closure, and valve-controlled means arranged to supply liquid from said circuit to operate said securing and releasing means and to return used liquid therefrom to said circuit.

27. A hydraulic apparatus as defined in claim 25 comprising also a hydraulic master unit arranged to operate said valve, and a pilot valve arranged to supply liquid from said circuit to operate said master unit and to return used liquid therefrom to said circuit.

28. A hydraulic apparatus comprising a receptacle and a removable closure designed to form a pressure-sustaining impregnating chamber, a source of impregnating liquid above atmospheric pressure, means arranged to secure said closure to said receptacle, means including a valve arranged to supply liquid and pressure from said source to said impregnating chamber and thereafter to reduce the pressure in the chamber to atmosphere while the closure is secured, and means controlled by said valve for operating said securing means to release the closure after the pressure in said chamber is reduced to atmosphere.

29. A hydraulic apparatus as defined in claim 28 in which the power for releasing said closure is supplied by said source of impregnating liquid.

30. A hydraulic apparatus comprising a plurality of individually operable hydraulic operating units, a source of operating liquid above atmospheric pressure, valve means arranged to supply liquid from said source to said operating units one at a time, power-operated mechanism arranged to operate said valve means with individually controllable dwells at the liquid-supplying positions, a plurality of electrical controlling circuits including individual circuit-closers operable by said hydraulic units respectively, a circuit-selector operable by said power-operated mechanism to connect said controlling circuits individually with a source of electric current, and means operable by current supplied through said controlling circuits individually to control successive valve-operating movements of said power-operated mechanism.

31. A hydraulic apparatus as defined in claim 30 in which said power-operated mechanism is hydraulically operated by liquid from said source of operating liquid.

32. A hydraulic apparatus comprising a receptacle and a removable closure designed to form a pressure-sustaining impregnating chamber, a source of impregnating liquid above atmospheric pressure, means for securing said closure against said receptacle, hydraulic means arranged to impart releasing movement to said securing means, hydraulic means arranged to retract said closure, means through which impregnating liquid is supplied from said source to said chamber, a timing device, and automatic means controlled by said timing device to cut off the supply of liquid to said chamber at the conclusion of a measured time interval and thereafter to supply liquid from said source to said hydraulic releasing means and said hydraulic retracting means.

33. A hydraulic apparatus comprising a receptacle and a removable closure designed to form a pressure-sustaining treatment chamber, means arranged to secure said closure against the receptacle, hydraulic means arranged to impart releasing movement to said securing means, a source of treating liquid above atmospheric pressure, and controlling means arranged to supply liquid from said source to said chamber and said hydraulic means successively, said controlling means including a pressure-responsive valve through which liquid is supplied to said chamber and by which the pressure of the liquid in the chamber is automatically released when the pressure on the supply side of said pressure-responsive valve falls below that on the chamber side thereof.

34. A hydraulic apparatus comprising a receptacle and a removable closure designed to form a pressure-sustaining treatment chamber, a source of treating liquid under pressure, hydraulic means arranged to secure said closure to, and release it from, said receptacle, conduits arranged to supply liquid from said source to said hydraulic means and to said receptacle, automatically operative valve means arranged to control the liquid supplied through said conduits first to secure said closure, thereafter to alter the hydraulic pressure in said receptacle, and still later to release said closure, controlling means responsive to a predetermined pressure in the treatment chamber, and timing means arranged to be set in operation by said controlling means to time a subsequent operation of said valve means.

35. An apparatus for treating articles with liquid comprising a receptacle and a removable closure designed to form a pressure-sustaining treatment-chamber, a source of liquid under pressure, hydraulic operating means arranged to retract said closure from the receptacle, conduits arranged to supply liquid from said source to said chamber and to said hydraulic means respectively, automatically operable valve means arranged to direct the liquid through said conduits alternately to said chamber and to said hydraulic means, and automatically operable means arranged to secure said closure to, and release it from, said receptacle.

36. An apparatus for treating articles with liquid comprising a receptacle and a removable closure designed to form a pressure-sustaining treatment chamber, a hydraulic mechanism arranged to lift said closure from the receptacle, a hydraulic mechanism arranged to lock said closure against the receptacle, a source of treating liquid under pressure, a distributing valve having a series of distributing ports for supplying liquid from said source to said lifting mechanism, said locking mechanism and said chamber successively, said valve also having means for releasing the liquid from said lifting mechanism, said locking mechanism and said receptacle successively, a hydraulic mechanism arranged to impart successive operating movements to said valve, and automatic controlling means by which liquid from said source is supplied to and released from said valve-operating mechanism.

37. An apparatus for treating articles with liquid comprising a receptacle and a removable closure designed to form a pressure-sustaining treatment chamber, a hydraulic circuit including a power-driven pump and a reservoir for storing treating liquid, hydraulic mechanism arranged to raise and lower said closure, conduits arranged to supply liquid from the pressure portion of said circuit to said closure-operating mechanism and to said receptacle and to return the liquid from them to said reservoir, a distributing valve having provisions for supplying the liquid to and returning it from said receptacle and said closure-operating mechanism successively through said conduits, hydraulic mechanism arranged to impart successive operating movements to said distributing valve, and automatic means arranged to supply liquid intermittently from said circuit to said valve-operating mechanism and to return said liquid to said reservoir.

38. A hydraulic apparatus comprising a receptacle and a removable closure designed to form a pressure-sustaining treatment chamber, a source of treating liquid above atmospheric pressure, a plurality of hydraulic units operable successively to operate, secure and release said closure, means including a distributing valve to supply liquid from said source to said treatment chamber and to said hydraulic units successively in a predetermined sequence, electrically-controlled means arranged to operate said distributing valve according to said sequence, a plurality of electrical circuits each including a circuit-closer, and a circuit-selector operable by said valve-operating means to connect said circuits one at a time with a source of operating current, one of said circuit-closers being operable at will to initiate a cycle of operations of said distributing valve and the others being operable automatically to continue the cycle.

ERNEST L. FICKETT.
WILLIAM O. FORMAN.
PHILIP E. ARTHUR.